United States Patent
Jorgensen et al.

(10) Patent No.: US 10,161,277 B2
(45) Date of Patent: Dec. 25, 2018

(54) CAPACITOR-POWERED CATALYST HEATER

(71) Applicant: GM GLOBAL TECHNOLOGY OPERATIONS LLC, Detroit, MI (US)

(72) Inventors: Scott W. Jorgensen, Bloomfield Township, MI (US); Shouxian Ren, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 32 days.

(21) Appl. No.: 15/495,445

(22) Filed: Apr. 24, 2017

(65) Prior Publication Data

US 2018/0306080 A1 Oct. 25, 2018

(51) Int. Cl.
*F01N 3/00* (2006.01)
*F01N 3/20* (2006.01)
*F01N 13/16* (2010.01)

(52) U.S. Cl.
CPC .......... *F01N 3/2026* (2013.01); *F01N 13/16* (2013.01); *F01N 2900/0602* (2013.01)

(58) Field of Classification Search
USPC ......... 60/274, 275, 277, 280, 284, 286, 300, 60/303
See application file for complete search history.

(56) References Cited

U.S. PATENT DOCUMENTS

| | | | |
|---|---|---|---|
| 5,580,477 A | 12/1996 | Oota et al. | |
| 8,875,487 B2* | 11/2014 | Katsuta | B60W 10/26 60/277 |
| 9,169,764 B2* | 10/2015 | Hashimoto | B60L 3/0069 |
| 9,518,493 B2 | 12/2016 | Hodgson et al. | |
| 2012/0004801 A1* | 1/2012 | Watanabe | F01N 3/2026 701/22 |
| 2012/0260638 A1* | 10/2012 | Yoshioka | F01N 3/2013 60/295 |
| 2013/0291526 A1* | 11/2013 | Gonze | F01N 3/027 60/311 |
| 2013/0305692 A1* | 11/2013 | Hashimoto | F01N 3/2013 60/274 |

FOREIGN PATENT DOCUMENTS

JP 2864768 B2 3/1996

* cited by examiner

*Primary Examiner* — Binh Q Tran
(74) *Attorney, Agent, or Firm* — Quinn IP Law

(57) ABSTRACT

An after-treatment (AT) system used to treat an exhaust gas flow emitted by an internal combustion engine includes a catalyst monolith configured to actively remove a pollutant from the exhaust gas flow. The AT system also includes a heating element configured to heat the catalyst monolith. The AT system additionally includes an energy-discharge unit configured to power the heating element. The energy-discharge unit includes an energy-storage device configured to supply electrical energy. The energy-discharge unit also includes a capacitor configured to receive the electrical energy from the energy-storage device and discharge the received electrical energy to power the heating element and thereby heat the catalyst monolith. A vehicle having an internal combustion engine operatively connected to such an AT system is also contemplated.

16 Claims, 2 Drawing Sheets

CAPACITOR-POWERED CATALYST HEATER

TECHNICAL FIELD

The present disclosure relates to a capacitor-powered heater for an exhaust after treatment catalyst.

BACKGROUND

Internal combustion (IC) engines typically include exhaust systems designed to collect, route, and discharge the engine's exhaust gases. An exhaust system commonly includes piping to guide exhaust gases away from the engine. Exhaust systems of modern IC engines also include various exhaust after-treatment (AT) devices, such as a gasoline three-way catalytic converter, a diesel oxidation catalytic converter, and other devices, to effectively convert toxic byproducts of combustion to less toxic substances by way of catalyzed chemical reactions.

A typical AT device employs a catalyst monolith selected or formulated to achieve effective performance at exhaust gas temperatures of the specific IC engine equipped therewith. Such an AT device is, however, less efficient under engine cold-start conditions and until the subject AT device achieves light-off, i.e., reaches its effective operating temperature. Accordingly, an IC engine equipped with such an AT device will generally produce elevated exhaust emissions following an engine cold-start and until the AT device light-off.

SUMMARY

One embodiment of the disclosure is directed to an after-treatment (AT) system for treating an exhaust gas flow emitted by an internal combustion engine includes a catalyst monolith configured to actively remove a pollutant from the exhaust gas flow. The AT system also includes a heating element configured to heat the catalyst monolith. The AT system additionally includes an energy-discharge unit configured to power the heating element. The energy-discharge unit includes an energy-storage device configured to supply electrical energy. The energy-discharge unit also includes a capacitor configured to receive the electrical energy from the energy-storage device and discharge the received electrical energy to power the heating element and thereby heat the catalyst monolith.

The electric heating element may be arranged in the exhaust gas flow upstream of the catalyst monolith and configured to further heat the exhaust gas flow to thereby heat the catalyst monolith. Such further heating of the exhaust gas flow may be accomplished either by adding sufficient heat energy to combust fuel and air inside the exhaust gas flow or adding heat energy short of commencing combustion.

The catalyst monolith may include either a ceramic or a metallic catalyst substrate configured to remove a pollutant from the exhaust gas flow. The heating element may be either embedded in or attached to the corresponding catalyst substrate.

Wherein the catalyst monolith includes the metallic catalyst substrate, the metallic catalyst substrate may be configured as the heating element, i.e., operated as the heating element.

The catalyst monolith may include a precious metal element activated by elevated temperature of the exhaust gas flow, while the heating element may be mounted externally to the catalyst monolith. The precious metal element may be at least one of platinum (Pt), palladium (Pd), and rhodium (Rh).

The AT system may also include a motor-generator configured to supply electrical energy either to the energy-discharge unit or to the heating element. The catalyst monolith may include other supportive catalyst ingredients, such as Ce, Zr, Mg, Mn, Co, Mo, Ni, Cu, Fe, Ba, La, Sr, Va, Ti, Si, Au, Ag, P and their oxides.

The AT system may additionally include an electronic controller configured to identify a cold-start of the engine and regulate operation of the motor-generator. The electronic controller may be additionally configured to regulate operation of the capacitor to discharge the received electrical energy and power the heating element in response to the identified cold-start of the engine.

The electronic controller may be additionally configured to regulate the motor-generator to supply electrical energy to the heating element after the capacitor has discharged the received electrical energy.

The engine may be cooled via an engine coolant. The controller may be in electronic communication with a first sensor configured to detect a temperature of the engine coolant and a second sensor configured to detect ambient temperature. In such a case, the controller may be configured to identify the cold-start of the engine via a comparison of the detected temperature of engine coolant and ambient temperature.

The controller may be additionally configured to regulate the capacitor to discharge the received electrical energy and thereby power the heating element to heat or regenerate the catalyst monolith.

Another embodiment of the present disclosure is directed to a vehicle having an internal combustion engine operatively connected to the AT system, as described above. The engine may be a compression-ignition or diesel type.

The vehicle may also include the electronic controller configured to identify a cold-start of the engine and regulate operation of the AT system.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
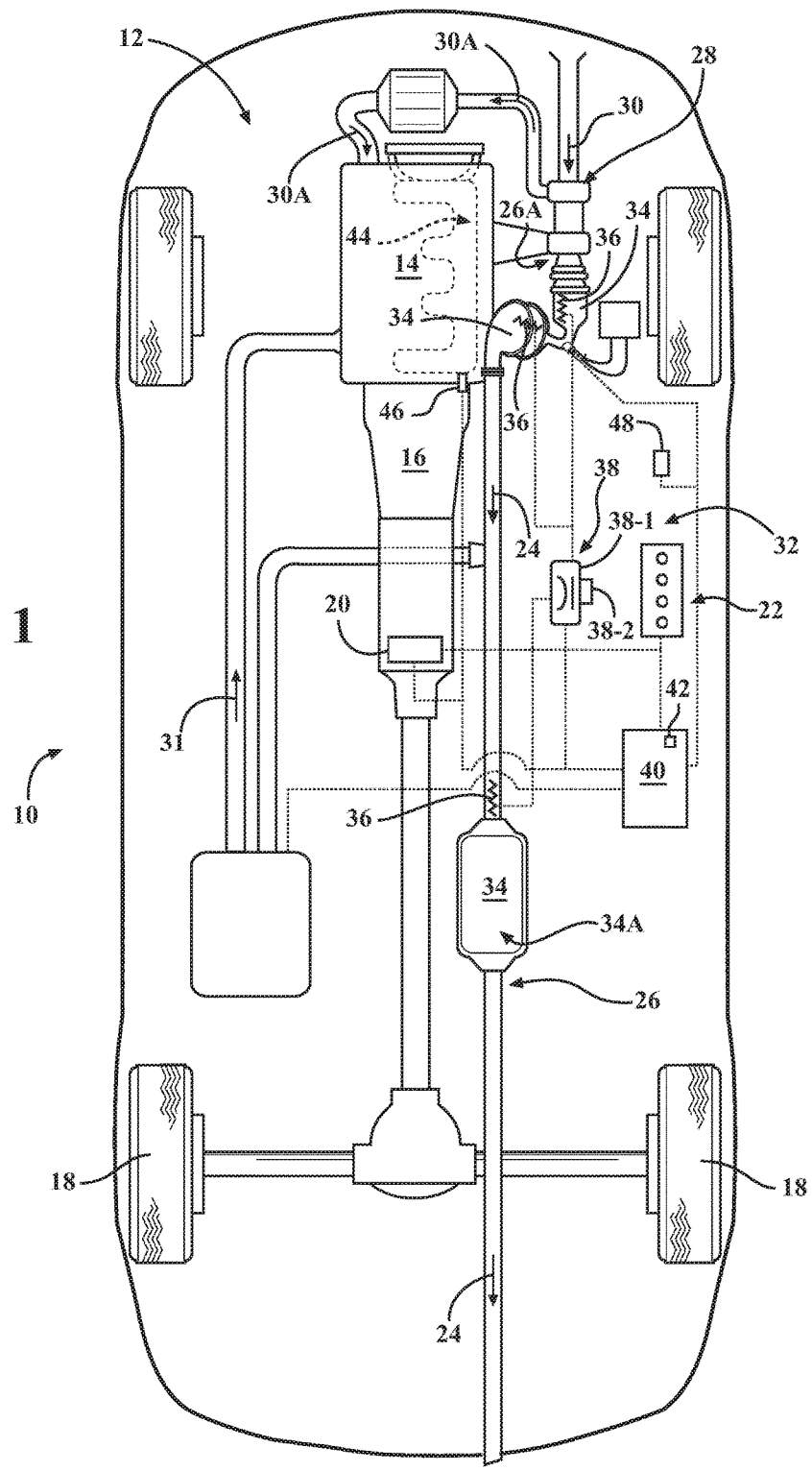
FIG. 1 is a schematic plan view of a motor vehicle having a powertrain, including an engine with an after-treatment (AT) system having an AT device, a heating element to heat the AT device, and an energy-discharge unit configured to power the heating element, according to the disclosure.

Referring to the drawings, wherein like reference numbers refer to like components throughout the several views, FIG. 1 schematically depicts a vehicle 10. The vehicle 10 employs a powertrain 12. The powertrain 12 includes an internal combustion engine 14, a transmission 16, and drive wheels 18, wherein the engine is configured to power the vehicle by sending engine torque through the transmission to the drive wheels. The engine 14 may be a diesel, i.e., a compression-ignition type, or a gasoline, i.e., a spark-ignition type, engine. Although the vehicle 10 is depicted as having a standard powertrain 12, where the primary powerplant is the engine 14, the vehicle may also be a hybrid type, where one or more electric motor-generators, such as the motor-generator 20, are used in powering the vehicle. The vehicle 10 also includes a main energy-storage system 22, such as one or more batteries and/or alternator (not shown). The main energy-storage system 22 is configured to supply electrical energy for powering various vehicle systems, such as an ignition system (not shown) configured to control combustion in the engine 14, or the above-noted electric motor-generator(s).

The engine 14 includes combustion chambers (not shown) configured to receive a fuel-air mixture for subsequent combustion therein. The engine 14 is also configured to exhaust post-combustion gases into an exhaust system 26, i.e., generate an exhaust gas flow 24, as a by-product of generated engine torque. As shown in FIG. 1, the engine 14 may include an exhaust gas-driven turbocharger 28. Specifically, the turbocharger 28 receives an airflow 30 from the ambient, pressurizes the received airflow, and discharges the pressurized airflow 30A to the engine 14 for subsequent mixing with an appropriate amount of fuel 31 and subsequent combustion of the resultant fuel-air mixture in the respective combustion chambers. As shown, the turbocharger 28 is connected to an exhaust passage 26A of the exhaust system 26 that receives the exhaust gas flow 24 and eventually releases the exhaust gases to the ambient, typically on a side or aft of the vehicle 10.

With continued reference to FIG. 1, the exhaust system 26 is part of an exhaust after-treatment (AT) system 32 configured to treat the exhaust gas flow 24. As shown, the AT system 32 also includes at least one AT device or catalytic converter, generally indicated by numeral 34. The exhaust passage 26A is configured to direct the exhaust gas flow 24 to the exhaust AT device 34. Each AT device 34 has a catalyst monolith 34A configured to actively remove a pollutant from the exhaust gas flow 24, having a specific catalyst substrate 34B formulated or selected to remove or neutralize a particular pollutant. The catalyst substrate 34B may be either a precious metal, a ceramic material, or a precious metal and ceramic material matrix. In the event that the engine 14 is a gasoline engine (not shown), the AT device 34 may be a three-way catalytic converter.

Specifically, a gasoline three-way catalytic converter is an exhaust after-treatment device that simultaneously performs three tasks: i) reduction of nitrogen oxides, ii) oxidation of carbon monoxide, and iii) oxidation of unburned hydrocarbons. The three-way catalytic converter may be regenerated to unload the deposited hydrocarbon emissions in order to forestall elevated temperatures in the catalytic converter that may eventually cause damage thereto. The first two tasks listed above employ a process of selective catalytic reduction (SCR) for converting oxides of nitrogen, also referred to as $NO_X$ with the aid of a catalyst into diatomic nitrogen, $N_2$, and water, $H_2O$. SCR is frequently employed to reduce $NO_X$ emissions in the exhaust of internal combustion engines used to power motor vehicles. Exhaust emissions of both gasoline and diesel engines may be improved by the SCR process.

In the event the engine 14 is a compression-ignition or diesel engine (shown in FIG. 1), the exhaust system 32 may include a series of AT devices 34. Such AT devices 34 in the diesel engine 14 may include one or more of the following: a diesel oxidation catalytic converter (DOC), an ammonia-based selective catalytic reduction (SCR) catalytic converter or an SCR filter (SCRF), a diesel particulate filter (DPF), and a lean $NO_X$ trap (LNT), none of which are specifically shown. Such exhaust after-treatment devices may be employed to reduce various exhaust emissions of the diesel engine. Each of the DOC, SCR catalytic converter or filter, DPF, and LNT typically contains precious metals, such as platinum and/or palladium, which function as catalysts in the subject devices to accomplish their respective objectives. Each of SCR catalytic converter and SCR filter (SCRF) generally includes zeolite material that contains at least one metal ion, such as Cu ion or Fe ion. Additionally, each of the DOC, SCR, SCRF, DPF, and LNT become activated and reach operating efficiency at elevated temperatures, typically, as the engine 14 approaches its normal operating temperature.

The primary function of the DOC is oxidation of carbon monoxides (CO) and non-methane hydrocarbons (NMHC). When present, the DOC is additionally configured to oxidize nitrogen oxide (NO) into nitrogen dioxide ($NO_2$), which may be used by an LNT and an SCR catalytic converter, or an SCR filter (SCRF), that are typically arranged remotely downstream of the DOC and described in greater detail below. Generally, with respect to generation of $NO_2$, the DOC becomes activated and reaches operating efficiency at elevated temperatures. The DOC is typically arranged as the first diesel AT device downstream of the engine 14 and may be close-coupled to the turbocharger 28 in order to reduce loss of thermal energy from the exhaust gas flow 24 prior to the gas reaching the DOC.

The ammonia-based SCR catalytic converter or SCRF is employed to reduce the diesel emission of $NO_X$ via the SCR process described above with respect to the gasoline engine specific three-way catalytic converter, and is generally positioned as the first AT device 34 downstream of the engine 14. The SCRF is generally configured as a 2-way filter, which includes a catalyzed wash-coat, and carries two functions—actively removes particulate matter and reduces $NO_X$. The SCRF convert nitrogen oxides ($NO_X$) into diatomic nitrogen ($N_2$) and water ($H_2O$) with the aid of the $NO_2$ generated by the DOC, as described above. For effective removal of $NO_X$, the SCR conversion process additionally requires a predetermined amount of ammonia ($NH_3$) to be present in the exhaust gas flow 24.

The DPF is configured to collect and dispose of the particulate matter emitted by a diesel engine prior to the exhaust gas flow being discharged to the atmosphere. Accordingly, the DPF acts as a trap for removing the particulate matter, specifically, soot, from the exhaust flow. The LNT is generally configured to reduce oxides of nitrogen or $NO_X$ that are emitted by a diesel engine as a byproduct of the reaction of nitrogen and oxygen gases in the air following a combustion event. The LNT removes $NO_X$ molecules from the exhaust gas flow by trapping and storing them internally during operation of the engine, thus acting like a molecular sponge. Typically, the LNT includes a ceramic honeycomb substrate structure with a catalyzed wash-coat, i.e., mixed with active precious metal, that is applied to channels of the substrate. The LNT continues to collect $NO_X$ molecules during operation of the engine until the trap is full. Once the LNT becomes full, and in order for it to be capable of adsorbing more $NO_X$, the trap is generally purged or regenerated to restore its storage capacity. Such regeneration of the LNT is typically accomplished via injection of hydrocarbons, i.e., fuel 31, directly into the exhaust gas flow upstream of the trap.

The AT system 32 includes the energy-storage system 22, and also includes a heating element 36 configured to heat the respective AT device 34. The heating element 36 may be specifically used to pre-heat the AT device immediately after a cold-start of the engine 14. The heating element 36 may be either embedded in or attached to the corresponding catalyst substrate 34B. The AT system 32 additionally includes an energy-discharge unit 38. The energy-discharge unit 38 includes a capacitor 38-1, such as an electrolytic capacitor, and a battery 38-2, thereby configured as an integrated capacitor-battery combination. The energy-discharge unit 38 may be independent from the energy-storage system 22. Alternatively, the energy-discharge unit 38 may be in electrical communication with the energy-storage system 22, and thus configured to receive and store electrical energy therefrom. Notably, the energy-discharge unit 38 does not require a DC-DC converter to achieve appropriate functionality In general, a capacitor is a passive two-terminal electrical device configured to store electrical energy in an electric field. The capacitor 38-1 may be configured as a supercapacitor or ultra-capacitor. In general, a supercapacitor is a high-capacity electrochemical capacitor with capacitance values exceeding typical capacitors, but having lower voltage limits, that bridge the gap between electrolytic capacitors and rechargeable batteries. Supercapacitors typically store 10 to 100 times more energy per unit volume or mass than electrolytic capacitors, can accept and deliver charge much faster than batteries, and tolerate many more charge and discharge cycles than rechargeable batteries. Supercapacitors are used in applications requiring many rapid charge/discharge cycles rather than long term compact energy storage.

The capacitor 38-1 is additionally configured to discharge the electrical energy received from the battery 38-2 to power the heating element 36 at a contact element 36A and thereby heat the AT device 34. The electric heating element 36 may be arranged in the exhaust gas flow 24, i.e., in the exhaust passage 26A, upstream of the AT device 34. In such an embodiment, the electric heating element 36 may be configured to combust fuel and air inside the exhaust gas flow 24 to thereby heat the AT device 34. Alternatively, electric heating element 36 may be configured to add a measure of heat energy to the exhaust gas flow 24 upstream of the AT device 34 that, while short of commencing combustion, would be sufficient to further increase temperature of the already hot exhaust gas.

In particular embodiments, the catalyst monolith 34A may include a ceramic catalyst substrate 34B activated by the elevated temperature of the exhaust gas flow 24. In such an embodiment, the heating element 36 may be embedded in the catalyst substrate 34B to heat the subject substrate. Alternatively, the catalyst monolith 34A may include a metallic catalyst substrate 34B, and the subject metallic catalyst substrate may be configured as the heating element 36, i.e., to directly receive the electrical energy either from the energy-storage system 22 or from the energy-discharge unit 38. Also, the catalyst substrate 34B may include at least one precious metal element activated by the elevated temperature of the exhaust gas flow 24. In such an embodiment, the heating element 36 may be mounted externally to the catalyst monolith to heat the precious metal element(s). The precious metal elements in the catalyst substrate 34B may be platinum (Pt), palladium (Pd), and rhodium (Rh). The catalyst monolith 34A may include other supportive catalyst ingredients, such as Ce, Zr, Mg, Mn, Co, Mo, Ni, Cu, Fe, Ba, La, Sr, Va, Ti, Si, Au, Ag, P and their oxides.

After a cold-start of the engine 14, i.e., when the engine is activated with its temperature at or near ambient, the engine proceeds through a "warm-up" period during which the engine's operating temperature is steadily increased. During the first couple minutes of operation of an internal combustion engine that has been started from a cold condition, an amount of exhaust emissions may be significantly higher than emissions during the engine's steady state operation. In cold engines fuel does not vaporize completely, thus requiring richer air-fuel ratios. Rich air-fuel ratios, in turn, generate higher emissions of hydrocarbons, nitrogen oxides, and carbon monoxide, which diminish as a result of the engine reaching operating temperature. A vehicle with a cold engine also generates increased exhaust emissions because a typical AT device is less efficient under cold conditions and until the subject AT device achieves light-off, i.e., reaches its effective operating temperature. According to the present disclosure, the energy-discharge unit 38 is used to apply heat energy to the AT device 34 to reduce the time it takes for the AT device to light-off. Additionally, the motor-generator 20 may be configured to supply electrical energy to the energy-storage system 22 or to the energy-discharge unit 38, or directly to the heating element 36, to accelerate the light-off of the AT device 34.

Figure 2:
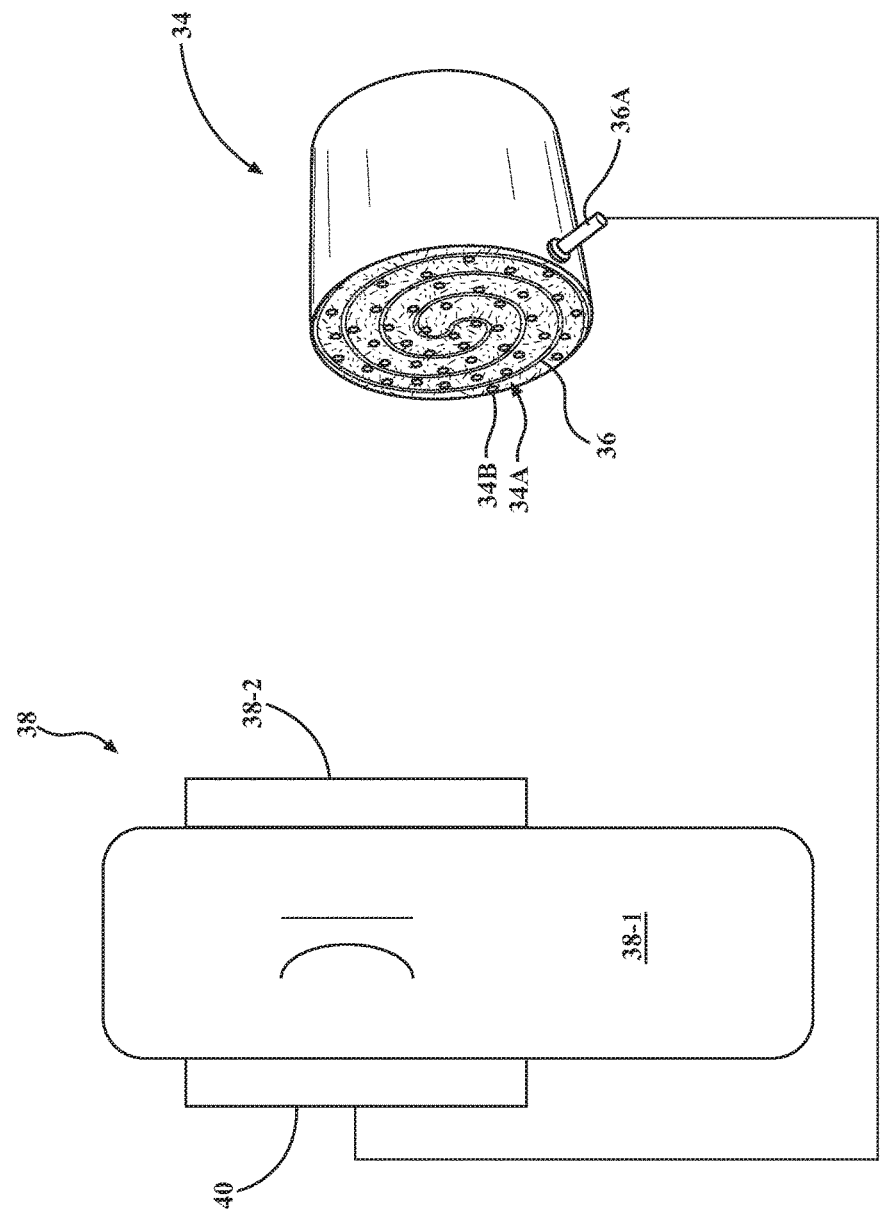
FIG. 2 is a schematic view of a partial cut-away of the AT device, the heating element arranged on the AT device, and the energy-discharge unit operatively connected to the heating element, according to the disclosure.

As shown in FIG. 1, the vehicle 10 also includes a controller 40. The controller 40 may be an electronic control module (ECM) or a powertrain controller, for example, configured to regulate operation of the engine 14, the transmission 16, the motor-generator 20, and the energy storage system 22. The controller 40 may be additionally configured to regulate the motor-generator 20 to supply electrical energy to the heating element 36 after the capacitor 38-1 has discharged the received electrical energy. Alternatively, as shown in FIG. 2, the controller 40 may be a dedicated electronic controller configured to regulate operation of the energy-discharge unit 38 in response to a command from an ECM after an engine key-on event had occurred. The motor-generator 20 may be used to supply electrical energy to the heating element 36 when the engine 14 is running and generating exhaust gas flow 24, such that the heating element is used to supplement the heat energy provided by the exhaust gas.

In order to appropriately perform the above tasks, the controller 40 includes a memory, at least some of which is tangible and non-transitory. The memory may be a recordable medium that participates in providing computer-readable data or process instructions. Such a medium may take many forms, including but not limited to non-volatile media and volatile media. Non-volatile media for the controller 40 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer.

Memory of the controller 40 may also include a flexible disk or a hard disk, magnetic tape, other magnetic medium, a CD-ROM, DVD, other optical medium, etc. The controller 40 may be configured or equipped with other required computer hardware, such as a high-speed clock, requisite Analog-to-Digital (A/D) and/or Digital-to-Analog (D/A) circuitry, input/output circuitry and devices (I/O), as well as appropriate signal conditioning and/or buffer circuitry. Algorithms required by the controller 40 or accessible thereby may be stored in the memory and automatically executed to provide the required functionality.

The controller 40 may be additionally configured to identify a cold-start 42 of the engine 14, and regulate the energy-discharge unit 38 to discharge the received electrical energy via the capacitor 38-1 and power the heating element 36 in response to the identified cold-start 42 of the engine. Typically, an engine coolant 44 is used to remove heat energy from the engine 14. The AT system 32 may additionally include a first sensor 46 configured to detect a temperature of the engine coolant 44 and a second sensor 48 configured to detect ambient temperature, e.g., temperature of the environment surrounding the vehicle 10. As shown in FIG. 1, the controller 40 is in electronic communication with the first and second sensors 46, 48, and may be further configured to identify the cold-start 42 of the engine 14 via a comparison of the detected engine coolant 44 and ambient temperatures.

Alternatively, the controller 40 may be configured to detect a key-on event for the engine 14, or a time check of when the engine was last operated. Any of the above indicators may be used by the controller 40 to determine if heating of the AT device 34 via the heating element 36 is required. For example, in the event down time of the engine 14 exceeds a predetermined amount of time programmed into the controller 40, the controller may determine that the cold-start 42 is in process, and commence heating the catalyst monolith 34A of the AT device 34 via the heating element 36. The controller 40 may be additionally configured to regulate the energy-discharge unit 38 to discharge the received electrical energy thereby. Accordingly, the controller 40 may thus be configured to power the heating element 36 and thereby regenerate the catalyst monolith 34A. Specifically, in the present embodiment, regeneration of the subject AT device 34 may occur when, for example, the AT device collects or becomes full of sooty particulate matter, and the heating element 36 is powered by the energy-discharge unit 38 to generate sufficient heat energy to burn off the soot.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. An after-treatment (AT) system for treating an exhaust gas flow emitted by an internal combustion engine, the AT system comprising:
    a catalytic converter having a catalyst monolith configured to actively remove a pollutant from the exhaust gas flow;
    a heating element configured to heat the catalyst monolith; and
    an energy-discharge unit configured to power the heating element;
    wherein the energy-discharge unit includes:
        an energy-storage device configured to supply electrical energy; and
        a capacitor configured to receive the electrical energy from the energy-storage device and discharge the received electrical energy to power the heating element and thereby heat the catalyst monolith;
    a motor-generator configured to supply electrical energy to one of the energy-discharge unit and the heating element; and
    an electronic controller configured to identify a cold-start of the engine, regulate operation of the motor-generator, and regulate the capacitor to discharge the received electrical energy and power the heating element in response to the identified cold-start of the engine.

2. The AT system of claim 1, wherein the electric heating element is arranged in the exhaust gas flow upstream of the catalyst monolith and configured to add heat energy to the exhaust gas flow upstream of the catalyst monolith.

3. The AT system of claim 1, wherein the catalyst monolith includes one of a ceramic and a metallic catalyst substrate configured to remove a pollutant from the exhaust gas flow, and wherein the heating element is one of embedded in and attached to the corresponding catalyst substrate.

4. The AT system of claim 3, wherein the catalyst monolith includes the metallic catalyst substrate, and wherein the metallic catalyst substrate is configured as the heating element.

5. The AT system of claim 3, wherein the catalyst monolith includes a precious metal element activated by elevated temperature of the exhaust gas flow, and wherein the heating element is mounted externally to the catalyst monolith.

6. The AT system of claim 1, wherein the electronic controller is additionally configured to regulate the motor-generator to supply electrical energy to the heating element after the capacitor has discharged the received electrical energy.

7. The AT system of claim 1, further comprising a first sensor configured to detect a temperature of an engine coolant and a second sensor configured to detect ambient temperature, wherein the controller is in electronic communication with the first and second sensors and additionally configured to identify the cold-start of the engine via a comparison of the detected engine coolant and ambient temperatures.

8. The AT system of claim 1, wherein the controller is additionally configured to regulate the capacitor to discharge the received electrical energy and thereby power the heating element to one of heat and regenerate the catalyst monolith.

9. A vehicle comprising:
    an internal combustion engine; and
    an after-treatment (AT) system operatively connected to the internal combustion engine for treating an exhaust gas flow emitted thereby, the AT system including:
        a catalytic converter having a catalyst monolith configured to actively remove a pollutant from the exhaust gas flow;
        a heating element configured to heat the catalyst monolith; and
        an energy-discharge unit configured to power the heating element;
        wherein the energy-discharge unit includes:
            an energy-storage device configured to supply electrical energy; and a capacitor configured to receive the electrical energy from the energy-storage device and discharge the received electrical energy to power the heating element and thereby heat the catalyst monolith;

a motor-generator configured to supply electrical energy to one of the energy-discharge unit and the heating element; and an electronic controller configured to identify a cold-start of the engine, regulate operation of the motor-generator, and regulate the capacitor to discharge the received electrical energy and power the heating element in response to the identified cold-start of the engine.

10. The vehicle of claim 9, wherein the electric heating element is arranged in the exhaust gas flow upstream of the catalyst monolith and configured to add heat energy to the exhaust gas flow upstream of the catalyst monolith.

11. The vehicle of claim 9, wherein the catalyst monolith includes one of a ceramic and a metallic catalyst substrate configured to remove a pollutant from the exhaust gas flow, and wherein the heating element is one of embedded in and attached to the corresponding catalyst substrate.

12. The vehicle of claim 11, wherein the catalyst monolith includes the metallic catalyst substrate, and wherein the metallic catalyst substrate is configured as the heating element.

13. The vehicle of claim 11, wherein the catalyst monolith includes a precious metal element activated by elevated temperature of the exhaust gas flow, and wherein the heating element is mounted externally to the catalyst monolith.

14. The vehicle of claim 9, wherein the electronic controller is additionally configured to regulate the motor-generator to supply electrical energy to the heating element after the capacitor has discharged the received electrical energy.

15. The vehicle of claim 9, wherein:

the engine is cooled via an engine coolant;

the AT system also includes a first sensor configured to detect a temperature of the engine coolant and a second sensor configured to detect ambient temperature; and the controller is in electronic communication with the first and second sensors, and further configured to identify the cold-start of the engine via a comparison of the detected engine coolant and ambient temperatures.

16. The vehicle of claim 9, wherein the controller is additionally configured to regulate the capacitor to discharge the received electrical energy and thereby power the heating element to regenerate the catalyst monolith.

\* \* \* \* \*